United States Patent [19]

Matsuda

[11] Patent Number: 5,165,763
[45] Date of Patent: Nov. 24, 1992

[54] HYDRAULIC BRAKING SYSTEM

[75] Inventor: Shohei Matsuda, Wako, Japan

[73] Assignee: Honda Giken Kogyo Kabushiki Kaisha, Tokyo, Japan

[21] Appl. No.: 780,509

[22] Filed: Oct. 22, 1991

[30] Foreign Application Priority Data

Oct. 24, 1990 [JP] Japan .................. 2-286563

[51] Int. Cl.$^5$ .................................. B60T 8/00
[52] U.S. Cl. .......................... 303/10; 303/3; 303/11; 303/116.2; 303/116.1
[58] Field of Search ............. 303/10, 11, 2, 3, 5, 303/6.01, 9.62, 113 R, 116 R, 116 SP, DIG. 1, DIG. 2, DIG. 6

[56] References Cited

U.S. PATENT DOCUMENTS

| | | | |
|---|---|---|---|
| 3,874,745 | 4/1975 | Peruglia et al. | 303/116 R |
| 4,395,073 | 7/1983 | Arikawa et al. | 303/116 R |
| 4,798,422 | 1/1989 | Becker | 303/DIG. 2 |
| 4,872,731 | 10/1989 | Nakamura | 303/11 |

FOREIGN PATENT DOCUMENTS 0237858 9/1990 Japan .................. 303/11

Primary Examiner—Matthew C. Graham
Attorney, Agent, or Firm—Armstrong & Kubovcik

[57] ABSTRACT

A hydraulic braking system having wheel cylinders, a tandem type master cylinder with first and second output ports, a hydraulic pressure transmitting device with a free piston slidably received in a housing with an input chamber located on one side of the free piston connected to the first output port in the master cylinder and an output chamber on the opposite side of said free piston leading to the wheel cylinders. An on-off valve is included, adapted to cut off the communication between a valve chest and the wheel cylinder in response to the hydraulic pressure in a pilot chamber leading to the first output port becoming larger than the hydraulic pressure in the valve chest by at least a given value. A differential pressure generating device is interposed between the second output port and the valve chest to reduce the output hydraulic pressure from the second output port in the master cylinder by a predetermined value to apply the reduced hydraulic pressure to the valve chest. This construction makes it possible to ensure that when a defect in hydraulic pressure is produced in a hydraulic pressure system connected to one of the output ports, a braking force is provided by an output hydraulic pressure from the other output port.

4 Claims, 2 Drawing Sheets

HYDRAULIC BRAKING SYSTEM

BACKGROUND OF THE INVENTION

1. Field of the Invention

The field of the present invention is hydraulic braking systems.

2. Description of the Prior Art

There are conventionally known hydraulic braking systems, as disclosed, for example, in Japanese patent application laid-open Nos. 178255/86 and 134361/87, in which one hydraulic braking pressure path communicated with an output port in a master cylinder is connected to wheel cylinders, so that a hydraulic braking pressure corresponding to a hydraulic pressure delivered from the output port in the master cylinder by a braking operation is applied to the wheel cylinders to provide a braking force.

In such a prior art hydraulic braking system, however, if a defect in hydraulic pressure is produced in a hydraulic pressure system connected to one output port in the master cylinder, it is impossible to provide a braking force in the wheel cylinder corresponding to the output port.

SUMMARY OF THE INVENTION

Accordingly, it is an object of the present invention to provide a hydraulic braking system having improved reliability such that when a defect in hydraulic pressure is produced in a hydraulic braking pressure system connected to one output port, a braking force is provided by an output hydraulic pressure from another output port thereby ensuring the availability of braking force.

To achieve the above object, according to the present invention, there is provided a hydraulic braking system comprising wheel cylinders, a tandem type master cylinder having first and second output ports, a hydraulic pressure transmitting means comprised of a free piston slidably received in a housing with both of an input chamber connected to the first output port in the master cylinder and an output chamber leading to the wheel cylinders facing opposite end faces of the free piston, respectively, an on-off valve adapted to cut off the communication between a valve chest and the wheel cylinders in response to the hydraulic pressure in a pilot chamber leading to the first output port becoming larger than the hydraulic pressure in the valve chest by at least a given value, and a differential pressure generating means interposed between the second output port and the valve chest to reduce the output hydraulic pressure from the second output port in the master cylinder by a predetermined value to apply the reduced hydraulic pressure to the valve chest.

With this construction, when no defect in hydraulic pressure is produced in any hydraulic braking pressure path during braking, hydraulic pressure in the valve chest in the on-off valve is lower than that in the pilot chamber by a predetermined value under the operation of the differential pressure generating means, thereby ensuring that the on-off valve is in its closed state. Therefore, by the operation of the free piston in response to the application of the hydraulic pressure delivered from the first output port in the master cylinder to the input chamber in the hydraulic pressure transmitting means, the hydraulic pressure in the output chamber is increased in accordance with the output hydraulic pressure from the first output port, thereby providing a braking force in the wheel cylinder.

If a defect in hydraulic pressure is produced in a path from the first output port to the hydraulic pressure transmitting means, the on-off valve is opened in response to a reduction in hydraulic pressure in the pilot chamber, so that the output hydraulic pressure from the second output port can be applied to the wheel cylinders through the valve chest in the on-off valve to provide a braking force in the wheel cylinders. Further, if a defect in hydraulic pressure is produced in a path from the second output port to the on-off valve, then the on-off valve is closed, so that the hydraulic pressure in the output chamber corresponding to the hydraulic pressure delivered from the first output port can be applied to the wheel cylinders to provide a braking force.

According to another aspect of the present invention, a pair of the hydraulic pressure transmitting means and a pair of the on-off valves are disposed in correspondence to a plurality of the wheel cylinders, respectively, and the input chamber in each of the hydraulic pressure transmitting means is connected to the first output port in the master cylinder independently through a normally-opened type solenoid on-off valve and is connected to a reservoir independently through a normally-closed type solenoid on-off valve. There is a hydraulic pump connected between the normally-opened type solenoid on-off valves and the first output port for pumping a working fluid from the reservoir.

With this construction, control of the opening and the closing of the normally-opened type and normally-closed type solenoid on-off valves makes it possible to control the hydraulic pressure in the input chamber to provide an anti-lock control of a braking fluid applied to the output chamber and thus to the wheel cylinders. The hydraulic pump serves to return the working fluid in an amount corresponding to the amount escaped to the reservoir, thereby avoiding an undesired increase in the quantity of braking operation. Moreover, the pairs of hydraulic pressure transmitting means and on-off valves are disposed in correspondence to the wheel cylinders and even if a defect in hydraulic pressure is produced in one of the pairs, any influence cannot be exerted on the other pair. Therefore, only the single hydraulic pump and only the single reservoir both common to the pairs of hydraulic pressure transmitting means and on-off valves are needed.

According to a further aspect of the present invention, the differential pressure generating means comprises a differential pressure regulating valve permitting only a flow from the second output port in the master cylinder toward the valve chest, a first one-way valve permitting only a flow from the valve chest toward the second output port, and a second one-way valve permitting only a flow from a reservoir added to the master cylinder toward the valve chest.

This ensures that a differential pressure can be developed by the differential pressure regulating valve, and during a period of non-braking, the working fluid can be returned to the master cylinder, and further ensures that during a "breathing" of a wheel cylinder, the working fluid from the reservoir added to the master cylinder can be drawn into the wheel cylinder by the operation of the second one-way valve.

The above and other objects, features and advantages of the invention will become apparent from a reading of the following description of the preferred embodiments, taken in conjunction with the accompanying drawings.

DESCRIPTION OF THE PREFERRED EMBODIMENT

The present invention will now be described by way of a preferred embodiment in connection with the accompanying drawings.

Figure 1:
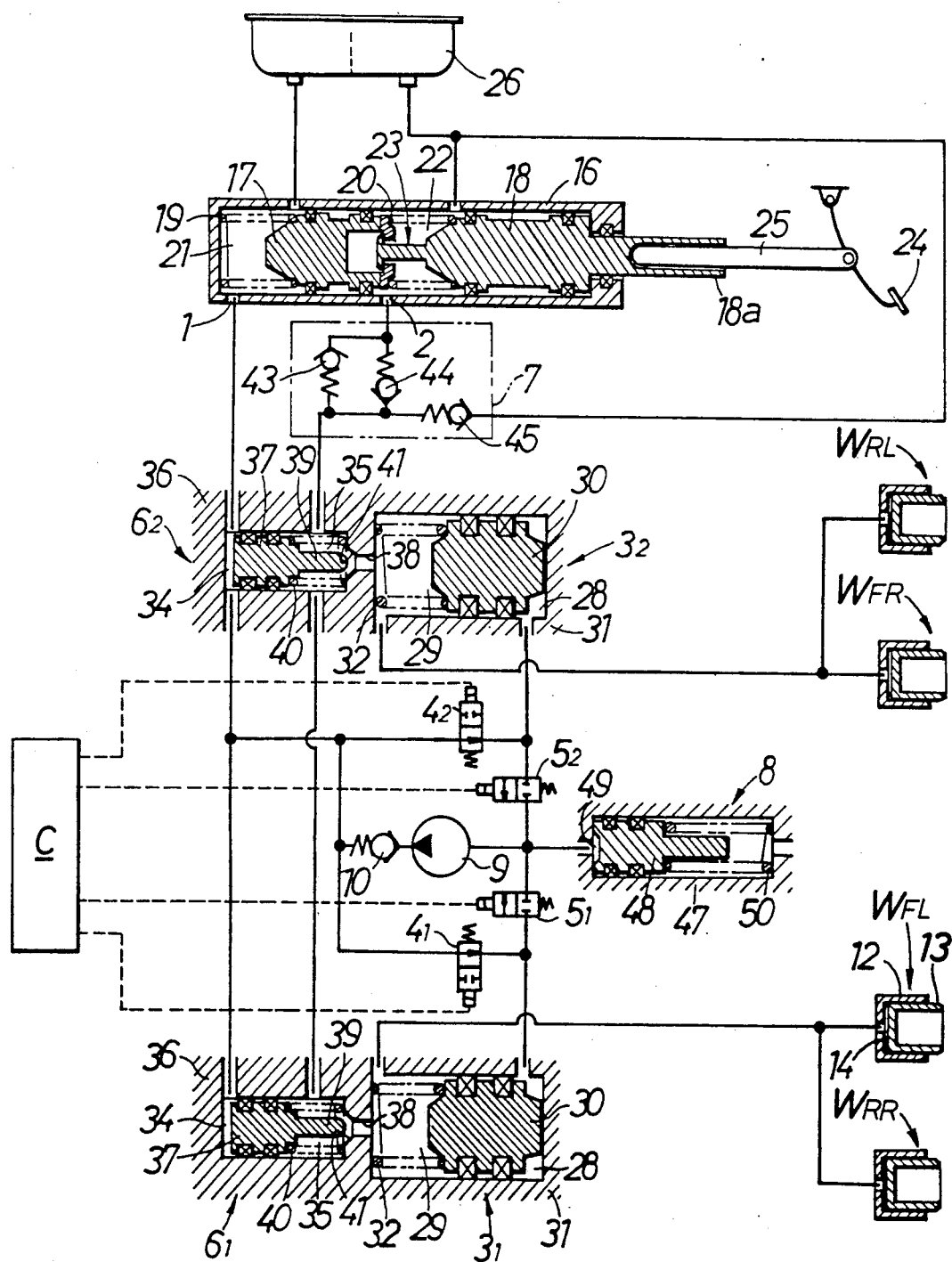
FIG. 1 is a diagram of a hydraulic braking pressure circuit according to one embodiment of the present invention.

Referring first to FIG. 1, wheel cylinders $W_{FL}$ and $W_{FR}$ are mounted on left and right front wheels of a vehicle, respectively, and cylinders $W_{RL}$ and $W_{RR}$ are mounted on left and right rear wheels, respectively. The wheel cylinders $W_{FL}$, $W_{FR}$, $W_{RL}$ and $W_{RR}$ are divided into two sets, with one set including the left front wheel cylinder $W_{FL}$ and the right rear wheel cylinder $W_{RR}$ and the second set including the right front wheel cylinder $W_{FR}$ and the left rear wheel cylinder $W_{RL}$. A first output port 1 in a tandem type master cylinder M is connected to the set including the left front wheel cylinder $W_{FL}$ and the rear front wheel cylinder $W_{RR}$ through a normally-opened type solenoid on-off valve $4_1$ and a hydraulic pressure transmitting means $3_1$, and a second output port 2 in the master cylinder M is connected to the one set of the left front wheel cylinder $W_{FL}$ and the rear front wheel cylinder $W_{RR}$ through a differential pressure generating means 7 and an on-off valve $6_1$, while the first output port 1 in the master cylinder M is connected to the other set of the right front wheel cylinder $W_{FR}$ and the left rear wheel cylinder $W_{RL}$ through a normally-opened type solenoid on-off valve $4_2$ and a hydraulic pressure transmitting means $3_2$, and the second output port 2 in the master cylinder M is connected to the other set of the right front wheel cylinder $W_{FR}$ and the left rear wheel cylinder $W_{RL}$ through a differential pressure generating means 7 and an on-off valve $6_2$. Normally-closed type solenoid on-off valves $5_1$ and $5_2$ are interposed between the hydraulic pressure transmitting means $3_1$ and $3_2$ and a reservoir 8, so that hydraulic braking pressures in the left front wheel cylinder $W_{FL}$ and the right rear wheel cylinder $W_{RR}$ as well as in the right front wheel cylinder $W_{FR}$ and the left rear wheel cylinder $W_{RL}$ are controlled by operation of the hydraulic pressure transmitting means $3_1$ and $3_2$ in accordance with the control of the opening and closing of the normally-opened type on-off valves $4_1$ and $4_2$ and the normally-closed type on-off valves $5_1$ and $5_2$.

Each of the wheel cylinders $W_{FL}$, $W_{FR}$, $W_{RL}$ and $W_{RR}$ comprises a cylinder body 12 and a braking piston 14 slidably received in the cylinder body 12 and is arranged to exhibit a braking force in response to an increase in hydraulic pressure in a hydraulic braking pressure chamber 14 defined between the cylinder body 12 and the braking piston 13.

The tandem type master cylinder M comprises a cylinder body 16 with its opposite ends closed, a first master piston 17 slidably received in the cylinder body 16, a second master piston 18 slidably received in the cylinder body 16 rearward of the first master piston 17, a first return spring 19 for biasing the first master piston 17 in a rearward direction, and a second return spring 20 for biasing the second master piston 18 in a rearward direction. The first return spring 19 is contained in a first hydraulic pressure chamber 21 defined between a front end wall of the cylinder body 16 and the first master piston 17, while the second return spring 20 is contained in a second hydraulic pressure chamber 22 defined between the first and second master pistons 17 and 18. Moreover, the first output port 1 is provided in the cylinder body 16 to communicate with the first hydraulic pressure chamber 21, while the second output port 2 is provided in the cylinder body 16 to communicate with the second hydraulic pressure chamber 22.

A spacing restraining means 23 is provided between the first and second master pistons 17 and 18 for restraining the maximum spacing therebetween. A piston rod 18a is connected to the second master piston 18 to movably extend through a rear end wall of the cylinder body 16, and form a liquid-tight seal therewith, and a front end of an urging rod 25 connected to a brake pedal 24 coaxially abuts against the piston rod 18a. Further, a reservoir 26 is added to the cylinder body 16 and adapted to communicate with the first and second hydraulic pressure chambers 21 and 22 when the first and second working pistons 17 and 18 assume their retreat limit positions.

The first and second master pistons 17 and 18 of master cylinder M are advanced in accordance with depression of the brake pedal 24, so that increased hydraulic pressures in the first and second hydraulic pressure chambers 21 and 22 are delivered through the first and second output ports 1 and 2.

The hydraulic pressure transmitting means $3_1$ and $3_2$ each have essentially the same construction. Components thereof will therefore be described with the like reference characters attached thereto.

Each of the hydraulic pressure transmitting means $3_1$ and $3_2$ is comprised of a free piston 30 slidably received in a housing 31 with an input chamber 28 and an output chamber 29 facing opposite end faces of the free piston 30. A return spring 32 having a spring force set at a small level is contained in the output chamber 29, so that the free piston 30 is biased by the spring force of the return spring 32 in a direction to reduce the volume of the input chamber 28.

The on-off valves $6_1$ and $6_2$ also have the same construction as each other. Components thereof will therefore be similarly described with the like reference characters attached thereto.

Each of the on-off valves $6_1$ and $6_2$ is adapted to permit a valve chest 35 to be put into communication with the output chamber 29 in the corresponding one of the hydraulic pressure transmitting means $3_1$ and $3_2$ and thus with each of the wheel cylinders $W_{FL}$, $W_{RR}$, $W_{FR}$ and $W_{RL}$ in response to the hydraulic pressure in a pilot chamber 34 becoming larger than the hydraulic pressure in the valve chest 35 by at least a given value. Each of the on-off valves $6_1$ and $6_2$ includes a housing 36 which can be integral with or separate from the housing 31 of the hydraulic pressure transmitting means $3_1$, $3_2$. A piston 37 is slidably received in the housing 36 with its opposite end faces facing the pilot chamber 34 and the valve chest 35, and a valve member 39 is integrally provided on the piston 37 to open and close a valve bore 38 which is provided in the housing 36 to communicate with the output chamber 29 in the hydraulic pressure transmitting means $3_1$, $3_2$ and opened into the valve chest 35. A return spring 40 is included, for biasing the piston 37 in a direction to reduce the volume of the pilot chamber 34.

The valve member 39 is formed into a rod coaxially projecting from an end face of the piston 37 facing the valve chest 35 and has a leading end formed hemispherically, so that it may seat on a tapered valve seat 41 which is provided on the housing 36 around an opened end of the valve bore 38 opened into the valve chest 35. The return spring 40 is compressed within the valve chest 35 between the housing 36 and the piston 37, and surrounding valve member 39.

The output chamber 29 in the hydraulic pressure transmitting means $3_1$ is connected to the hydraulic braking pressure chambers 14 in the left front wheel cylinder $W_{FL}$ and the right rear wheel cylinder $W_{RR}$, and the input chamber 28 is connected to the first output port 1 through the normally-opened type solenoid on-off valve $4_1$. The output chamber 29 in the hydraulic pressure transmitting means $3_2$ is connected to the hydraulic braking pressure chambers 14 in the right front wheel cylinder $W_{FR}$ and the left rear wheel cylinder $W_{RL}$, and the input chamber 28 is connected to the first output port 1 through the normally-opened type solenoid on-off valve $4_2$. The pilot chambers 34 in the on-off valves $6_1$ and $6_2$ are connected to the first output port 1 in the master cylinder M, and the valve chests 35 are connected to the second output port 2 in the master cylinder M through the differential pressure generating means 7.

The differential pressure generating means 7 is comprised of a differential pressure regulating valve 43 interposed between the second output port 2 in the master cylinder M and the valve chest 35, a first one-way valve 44 connected in parallel to the differential pressure regulating valve 43, and a second one-way valve 45 interposed between the valve chest 35 and the reservoir 26 added to the master cylinder M.

Figure 2:
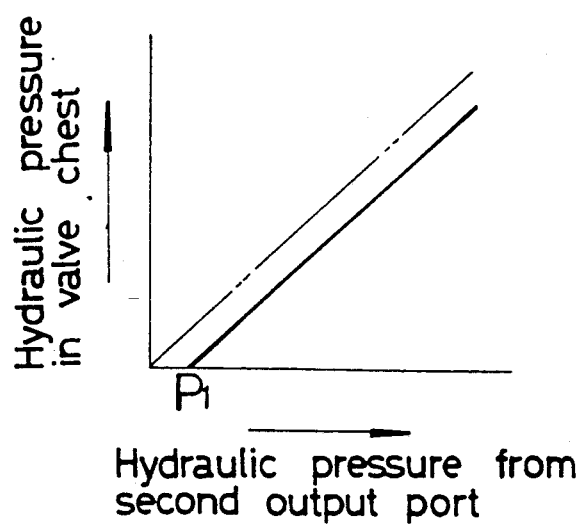
FIG. 2 is a graph illustrating a hydraulic pressure characteristic provided by a differential pressure generating means.

The differential pressure regulating valve 43 is adapted to be opened to permit flow of a working fluid from the second output port 2 toward the valve chest 35 when the output hydraulic pressure from the second output port 2 exceeds a preset pressure $P_1$, as shown in FIG. 2, so that a hydraulic pressure reduced in a predetermined relationship as compared with the output hydraulic pressure from the first output port 1 indicated by a dashed line in FIG. 2 is applied to the valve chest 35.

The first one-way valve 44 is adapted to be opened in response to the pressure on the side of the second hydraulic pressure chamber 22 becoming smaller than the pressure on the side of the valve chest 35, thereby permitting the working fluid on the side of the valve chest 35 to escape to the side of the second hydraulic pressure chamber 22.

The second one-way valve 45 is adapted to be opened in response to the pressure on the side of the valve chest 35 becoming smaller than the pressure on the side of the reservoir 26, thereby permitting a flow of the working fluid on the side of the reservoir 26 toward the valve chest 35.

Thus, the differential pressure generating means 7 is capable of reducing the pressure in the second hydraulic pressure chamber 22 by a predetermined value by the operation of the differential pressure regulating valve 43 to apply the reduced pressure to the valve chest 35 during a braking, and permitting the working fluid on the side of the valve chest 35 to escape to the side of the second hydraulic pressure chamber 22 through the first one-way valve 44 in response to a reduction in pressure in the second hydraulic pressure chamber 22 as a result of completion of the braking operation. Also, the differential pressure generating means 7 ensures that breathing between the hydraulic braking pressure chamber 14 in each of the wheel cylinders $W_{FL}$, $W_{RR}$, $W_{FR}$ and $W_{RL}$ and the differential pressure regulating valve 43, for example, due to a variation in temperature and an advancing movement of the braking piston 13 as brake pads wear down, can occur through the first one-way valve 44 in increasing the hydraulic braking pressure and through the second one-way valve 45 in reducing the hydraulic braking pressure.

The input chambers 28 in the hydraulic pressure transmitting means $3_1$ and $3_2$ are independently connected to the reservoir 8 through the normally-closed type solenoid on-off valves $5_1$ and $5_2$, respectively, and a hydraulic pump 9 for pumping the working fluid from the reservoir 8 is connected between the normally-opened type solenoid on-off valves $4_1$ and $4_2$ and the first output port 1 through a check valve 10. Moreover, the opening and closing of each of the solenoid on-off valves $4_1$, $4_2$, $5_1$ and $5_2$ are controlled by a control means C.

The reservoir 8 comprises a reservoir body 47, a piston 48 slidably received in the reservoir body 47, and a spring 50 for biasing the piston 48 in a direction to reduce the volume of a reservoir chamber 49 defined between the reservoir body 47 and the piston 48. The spring 50 has a spring load set at a relatively small level. The input chamber 28 in the hydraulic pressure transmitting means $3_1$ and $3_2$ are connected to the reservoir chamber 49 through the normally-closed type solenoid on-off valves $5_1$ and $5_2$, respectively.

The operation of this embodiment will be described below. During normal braking, the normally-opened solenoid on-off valves $4_1$ and $4_2$ are opened, and the normally-closed type solenoid on-off valves $5_1$ and $5_2$ are closed. If the brake pedal 24 is depressed for braking in this condition, a hydraulic pressure delivered from the first output port 1 in the master cylinder M is applied directly to the pilot chambers 34 in the on-off valves $6_1$ and $6_2$ and to the input chambers 28 in the hydraulic pressure transmitting means $3_1$ and $3_2$. On the other hand, a hydraulic pressure delivered from the second output port 2 in the master cylinder M is reduced to a level lower than the output hydraulic pressure from the first output port 1 as shown in FIG. 2 by the operation of the differential pressure generating means 7 and applied to the valve chests 35 in the on-off valves $6_1$ and $6_2$. This causes the pistons 37 of the on-off valves $6_1$ and $6_2$ to be moved in the direction to reduce the volume of the valve chest 35, so that the valve members 39 seat on the valve seats 41 to close the valve bores 38. Thus, in each of the hydraulic pressure transmitting means $3_1$ and $3_2$, the free piston 30 is moved in the direction to reduce the volume of the output chamber 29 in accordance with the output hydraulic pressure delivered from the first output port 1 and applied to the input chamber 28, so that the hydraulic pressure increased in accordance with such reduction of the volume is applied to each of the wheel cylinders $W_{FL}$, $W_{RR}$, $W_{FR}$ and $W_{RL}$.

If a wheel, e.g., a left front wheel or a right rear wheel is about to enter a locked state during such braking, then the normally-opened type solenoid on-off valve $4_1$ is closed, and the normally-closed type solenoid on-off valve $5_1$ is opened. This causes the free piston 30 to be moved in the direction to reduce the volume of the input chamber 28 in response to a reduction in hydraulic pressure in the input chamber $28_1$ in the hydraulic pressure transmitting means $3_1$, thereby increasing the volume of the output chamber 29 to reduce the hydraulic braking pressure in the wheel cylinder $W_{FL}$, $W_{RR}$. To maintain the hydraulic braking pressure, the normally-opened type solenoid on-off valve $4_1$ may be closed, and the normally-closed type solenoid on-off valve $5_1$ may be closed. To increase the hydraulic braking pressure, the normally-opened type solenoid on-off valve $4_1$ may be opened, and the normally-closed type solenoid on-off valve $5_1$ may be closed. The working fluid escaped into the reservoir 8 during such maintaining and decreasing of the hydraulic braking pressure is returned to a side upstream of the normally-opened type solenoid on-off valve 4, by the hydraulic pump 9, and the amount of advancing movement of the master pistons 17 and 18 and the amount of depression of the brake pedal 24 in the master cylinder M cannot be increased to such a value as corresponding to the amount of working fluid escaped.

To effect an anti-lock control for the right front wheel and the left rear wheel, the opening and closing of the normally-opened type solenoid on-off valve $4_2$ and the normally-closed type solenoid on-off valve $5_2$ may be controlled. If doing so, the hydraulic pressure transmitting means $3_2$ is operated to control the hydraulic braking pressures of the wheel cylinders $W_{FR}$ and $W_{RL}$ in the same manner as for the above-described control of the hydraulic braking pressures of the left front wheel and the right rear wheel.

A condition can exist where a defect in hydraulic pressure has been produced in a hydraulic pressure path from the first output port 1 to the input chambers 28 in the hydraulic pressure transmitting means $3_1$ and $3_2$ during braking. In this case, the hydraulic pressure in the pilot chambers 34 in the on-off valves $6_1$ and $6_2$ is reduced to open the on-off valves $6_1$ and $6_2$, so that the second output port 2 in the master cylinder M is put into communication with the wheel cylinders $W_{FL}$, $W_{RR}$, $W_{FR}$ and $W_{RL}$ through the differential pressure generating means 7. This ensures that the hydraulic pressure reduced in the differential pressure generating means 7 can be applied to each of the wheel cylinders $W_{FL}$, $W_{RR}$, $W_{FR}$ and $W_{RL}$ to provide a braking force.

If a defect in hydraulic pressure is produced in a hydraulic pressure path from the second output port 2 to the valve chests 35 in the on-off valves $6_1$ and $6_2$, then the on-off valves $6_1$ and $6_2$ remain closed. Therefore, a braking force corresponding to the amount of braking operation can be provided in each of the wheel cylinders $W_{FL}$, $W_{RR}$, $W_{FR}$ and $W_{RL}$ in the same manner as when no defect in hydraulic pressure is produced.

What is claimed is:

1. A hydraulic braking system comprising:

a plurality of wheel cylinders for providing a braking action;

a tandem type master cylinder having first and second output ports, said master cylinder receiving braking input from a braking input source;

a hydraulic pressure transmitting means including a free piston slidably received in a housing having an input chamber on a first side of said free piston in communication with said first output port in said master cylinder and an output chamber on a second side of said free piston, opposed to said first side, said output chamber in communication with at least one of said plurality of wheel cylinders;

an on-off valve having a valve chest therein and adapted to cut off fluid communication between said valve chest and at least one of said plurality of wheel cylinders in response to a hydraulic pressure in a pilot chamber leading to said first output port becoming larger than the hydraulic pressure in the valve chest by at least a given value; and a differential pressure generating means interposed between said second output port and said valve chest to reduce the output hydraulic pressure from said second output port in said master cylinder by a predetermined value to apply a reduced hydraulic pressure to said valve chest.

2. A hydraulic braking system according to claim 1, wherein a pair of the hydraulic pressure transmitting means and a pair of the on-off valves are disposed in correspondence to a plurality of the wheel cylinders, respectively, and the input chamber in each of the hydraulic pressure transmitting means is connected to the first output port in the master cylinder independently through a normally-opened type solenoid on-off valve and is connected to a first reservoir independently through a normally-closed type solenoid on-off valve, and said system further includes a hydraulic pump connected between said normally-opened type solenoid on-off valves and the first output port for pumping a working fluid from the reservoir.

3. A hydraulic braking system according to claim 2, wherein said differential pressure generating means comprises a differential pressure regulating valve permitting only a flow from the second output port in said master cylinder toward said valve chest, a first one-way valve permitting only a flow from said valve chest toward the second output port, and a second one way valve permitting a flow from a second reservoir added to said master cylinder toward said valve chest.

4. A hydraulic braking system according to claim 1, wherein said differential pressure generating means comprises a differential pressure regulating valve permitting only a flow from the second output port in said master cylinder toward said valve chest, a first one-way valve permitting only a flow from said valve chest toward the second output port, and a second one-way valve permitting only a flow from a reservoir added to said master cylinder toward the valve chest.

* * * * *